M. HUBLER.
AGRICULTURAL MACHINE.
APPLICATION FILED DEC. 27, 1912.
1,174,983.
Patented Mar. 14, 1916.
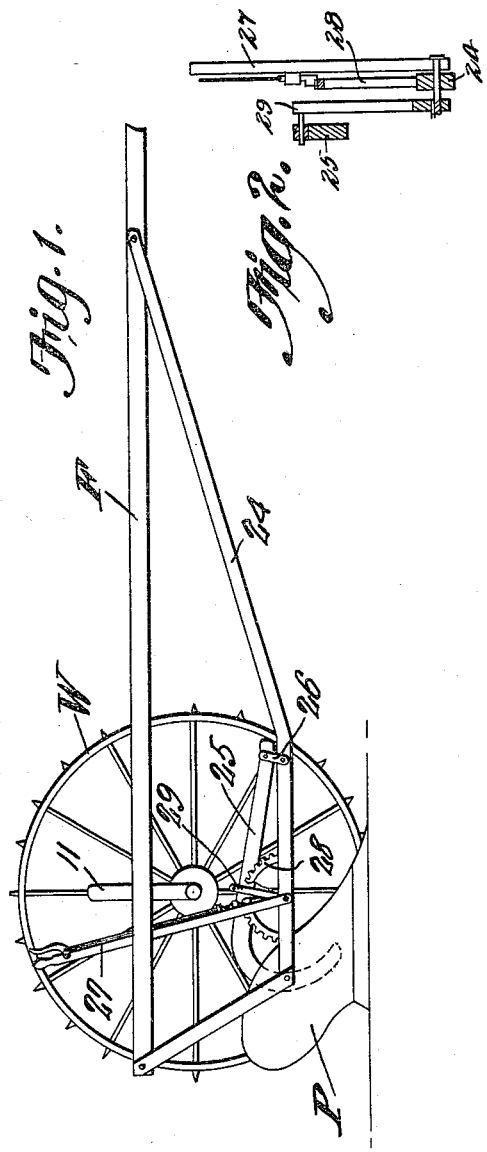

UNITED STATES PATENT OFFICE.

MARION HUBLER, OF VILAS, KANSAS.

AGRICULTURAL MACHINE.

1,174,983. Specification of Letters Patent. Patented Mar. 14, 1916.

Application filed December 27, 1912. Serial No. 738,942.

*To all whom it may concern:*

Be it known that I, MARION HUBLER, a citizen of the United States, residing at Vilas, in the county of Wilson and State of Kansas, have invented a new and useful Agricultural Machine, of which the following is a specification.

The present invention appertains to agricultural machines, and aims to provide novel and improved means for adjusting a plow beam relative to the frame.

The invention is illustrated in the accompanying drawing, wherein:—

Figure 1 is a fragmental elevation of the machine, the near wheel being removed. Fig. 2 is a sectional detail of the plow beam adjusting means.

The machine embodies a suitable frame F having an axle 11 to which the wheels W are journaled, only one of said wheels being illustrated in Fig. 1. Secured to the frame F is an understructure 24 to which the forward end of the plow beam 25 is loosely connected by means of a link 26. The plow beam 25 may be raised or lowered so as to bring the plow P into and out of engagement with the soil, by means of a hand lever 27 having its lower end pivoted to the understructure 24, and having its pawl or dog engageable with the segment 28, the lever having an arm 29 attached thereto and the free end of the arm being pivoted to the plow beam at an intermediate point. Thus, by swinging the lever 27, the plow beam may be effectively raised or lowered for properly positioning the plow.

Having thus described the invention, what is claimed as new is:—

In an agricultural machine, a wheel mounted frame having an under structure, a plow beam disposed below the frame, a link connecting the forward end of the plow beam and under structure, a hand lever having its lower end fulcrumed to the under structure and having an arm pivoted to the plow beam, and means for holding the hand lever at various adjusted positions.

In testimony that I claim the foregoing as my own, I have hereto affixed my signature in the presence of two witnesses.

MARION HUBLER.

Witnesses:
J. SWINKLER,
JOE WILTSE.

Copies of this patent may be obtained for five cents each, by addressing the "Commissioner of Patents, Washington, D. C."